United States Patent [19]
Margerum

[11] Patent Number: 4,481,519
[45] Date of Patent: Nov. 6, 1984

[54] RADIO FREQUENCY SIGNAL DIRECTION FINDING APPARATUS

[75] Inventor: Donald L. Margerum, Santa Barbara, Calif.

[73] Assignee: Raytheon Company, Lexington, Mass.

[21] Appl. No.: 463,683

[22] Filed: Feb. 3, 1983

Related U.S. Application Data

[63] Continuation of Ser. No. 318,493, Nov. 5, 1981, abandoned, which is a continuation of Ser. No. 106,117, Dec. 21, 1979, abandoned.

[51] Int. Cl.$^3$ ............................................. G01S 5/04
[52] U.S. Cl. ............................ 343/434; 343/5 SW; 343/5 NQ
[58] Field of Search ............... 343/374, 429, 434, 433, 343/436, 5 NQ, 5 SW; 324/83 R, 83 A

[56] References Cited

U.S. PATENT DOCUMENTS

| | | |
|---|---|---|
| 2,426,176 | 8/1947 | Busignies ............................ 343/433 |
| 2,829,365 | 4/1958 | Troost et al. ........................ 343/435 |
| 2,997,710 | 8/1961 | Cotuno ............................... 343/422 |
| 3,013,265 | 12/1961 | Wheeler .............................. 343/447 |
| 3,050,728 | 8/1962 | Worley ............................... 343/432 |
| 4,135,191 | 1/1979 | Sawicki .............................. 343/436 |

*Primary Examiner*—Theodore M. Blum
*Attorney, Agent, or Firm*—Richard M. Sharkansky; Joseph D. Pannone

[57] ABSTRACT

A system for determining the difference in phase between a pair of radio frequency signals wherein quadrature components of one of such pair of signals are alternatively combined with the other one of such pair of radio frequency signals to provide sum and difference signals thereof. Alternative ones of such sum and different signals are alternatively coupled to an output to provide a composite signal having a phase related to the difference in phase between the pair of radio frequency signals. The composite signal is then amplified and the phase of the amplified radio frequency signal is detected to determine the difference in phase between the pair of radio frequency signals.

5 Claims, 9 Drawing Figures

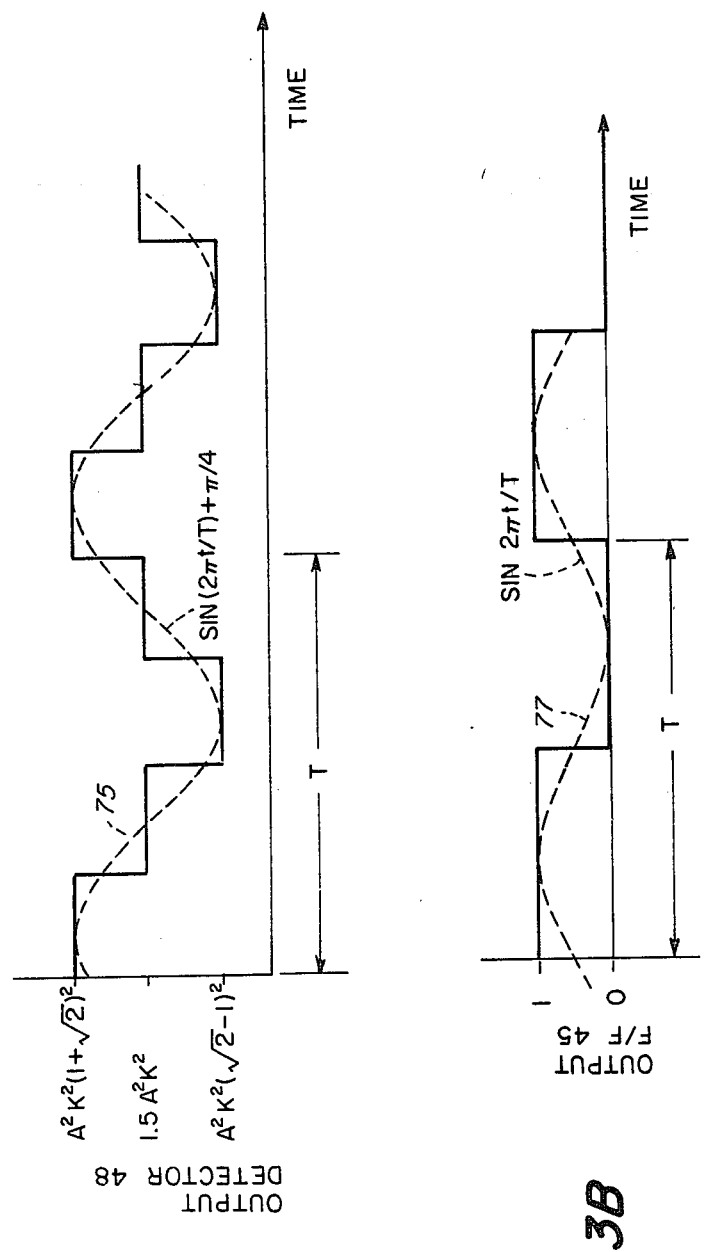

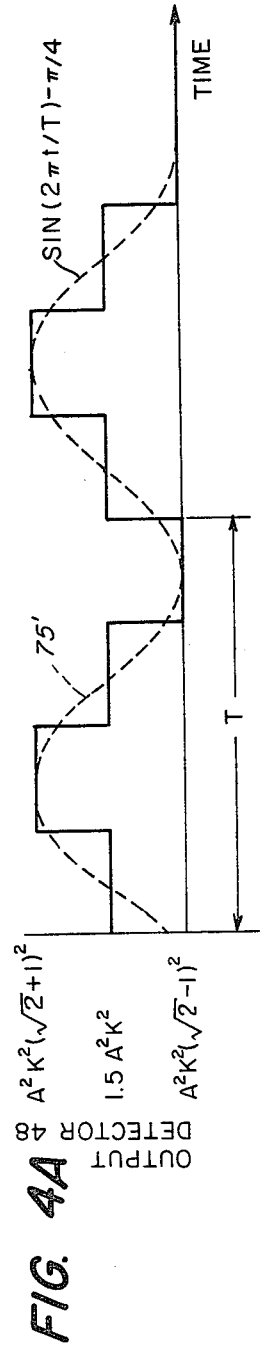
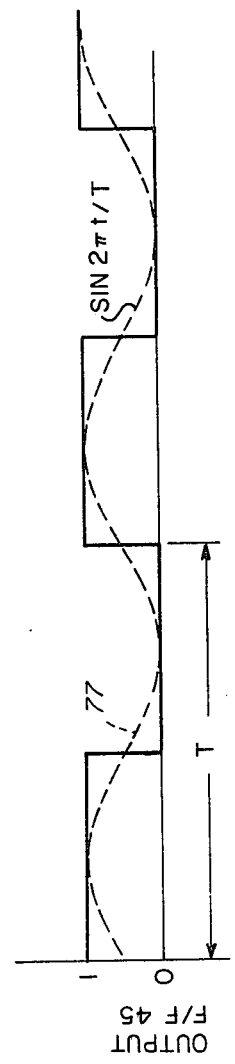
FIG. 4A
FIG. 4B

RADIO FREQUENCY SIGNAL DIRECTION FINDING APPARATUS

CROSS-REFERENCE TO RELATED CASES

This is a continuation of application Ser. No. 318,493 (now abandoned) filed Nov. 5, 1981 which is a continuation of application Ser. No. 106,117 filed Dec. 21, 1979, now abandoned.

BACKGROUND OF THE INVENTION

This invention relates generally to radio frequency signal direction finding apparatus and more particularly to types of such apparatus which measure the phase differences between received radio frequency signals having frequencies over a wide band of frequencies and having relatively short time durations.

As is known in the art, interferometer antenna signals have been used to provide accurate direction finding wherein a pair of antennas, spatially displaced a predetermined distance, receive signals with phase differences related to the predetermined distance of separation, the frequency of the received signals and the angular direction of the source of such received signals. Such systems have been suggested in U.S. Pat. No. 3,221,251 and U.S. Pat. No. 3,611,135. In order to provide amplification to the received radio frequency signals a pair of traveling wave tube (TWT) amplifiers is coupled to the pair of antennas. With such arrangement it is necessary that the phase shifts provided by the TWT amplifiers be proprely balanced or matched over a wide range of operating frequencies and signal strengths in order to obtain a proper measure of the phase shift between the received signals and hence a proper determination of the angular direction of the source of the radio frequency signal.

In a known system one of the pair of antennas is fed to a phase modulation section made up of plurality of switched delay lines. The output of the phase modulation section is a phase modulated signal which, when combined with the signal received at the other one of the pair of antennas, provides a composite, amplitude modulated signal. The composite amplitude modulated signal is then amplified in a radio frequency amplifier. The amplified signal is then compared with the phase modulating signal fed to the phase modulation section which is used to switch the delay lines to provide an output signal indicating the phase difference between the signals received by the pair of antennas and hence an indication of the direction of the received signals. While such technique may be useful in many applications, such technique has a relatively narrow operating bandwidth.

SUMMARY OF THE INVENTION

In accordance with the present invention a system is provided for determining the difference in phase between a pair of radio frequency signals. The first one of the pair of radio frequency signals is passed to a first hybrid junction to provide a pair of quadrature signals. The quadrature signals are fed to a switch which, in response to a square wave signal, alternately couples each one of the pair of quadrature signals to an output of such switch. The output of the switch is fed to a first input of a second hybrid junction. The second one of the pair of radio frequency signals is fed to a second input of the second hybrid junction. The second hybrid junction has a pair of output terminals, one of which provides a signal representative of the sum of the signals fed to the pair of inputs of such second hybrid junction and the other output terminal provides a signal representative of the difference between the signals fed to the pair of inputs to such second hybrid junction. The pair of output terminals of the second hybrid junction is fed to a second switch, which, in response to a square wave signal having a fundamental frequency component half that of the square wave signal fed to the first-mentioned switch, produces a composite radio frequency signal. The composite radio frequency signal is amplified in a radio frequency amplifier and is then passed through a video detector to produce the third electrical signal having as a fundamental frequency component the fundamental frequency component of the square wave signal fed to the second switch. The third electrical signal and the square wave signal which is fed to the second switch are fed to a phase detector means for determining the difference in phase between the fundamental frequency components of such signals.

The pair of hybrid junctions enables the phase of the first one of the pair of radio frequency signals to periodically change $\pi/2$ radians each quarter cycle of the square wave signal. This periodically $\pi/2$ radian phase changed signal is added to the second one of the radio frequency signals to form a composite radio frequency signal which is fed to the radio frequency amplifier. The use of a pair of hybrid junctions increases the operating bandwidth.

BRIEF DESCRIPTION OF THE DRAWINGS

The foregoing features of this invention, as well as the invention itself, may be more fully understood from the following detailed description read together with the accompanying drawings, in which:

FIGS. 3A-3B are diagrams useful in understanding the operation of the direction finding system of FIG. 1 when signals received by a pair of antennas in such system are in phase with each other; and FIGS. 4A-4B are diagrams useful in understanding the operation of the direction finding system of FIG. 1 when signals received by the pair of antennas in such system are 90° of phase with each other.

DESCRIPTION OF THE PREFERRED EMBODIMENTS

Figure 1:
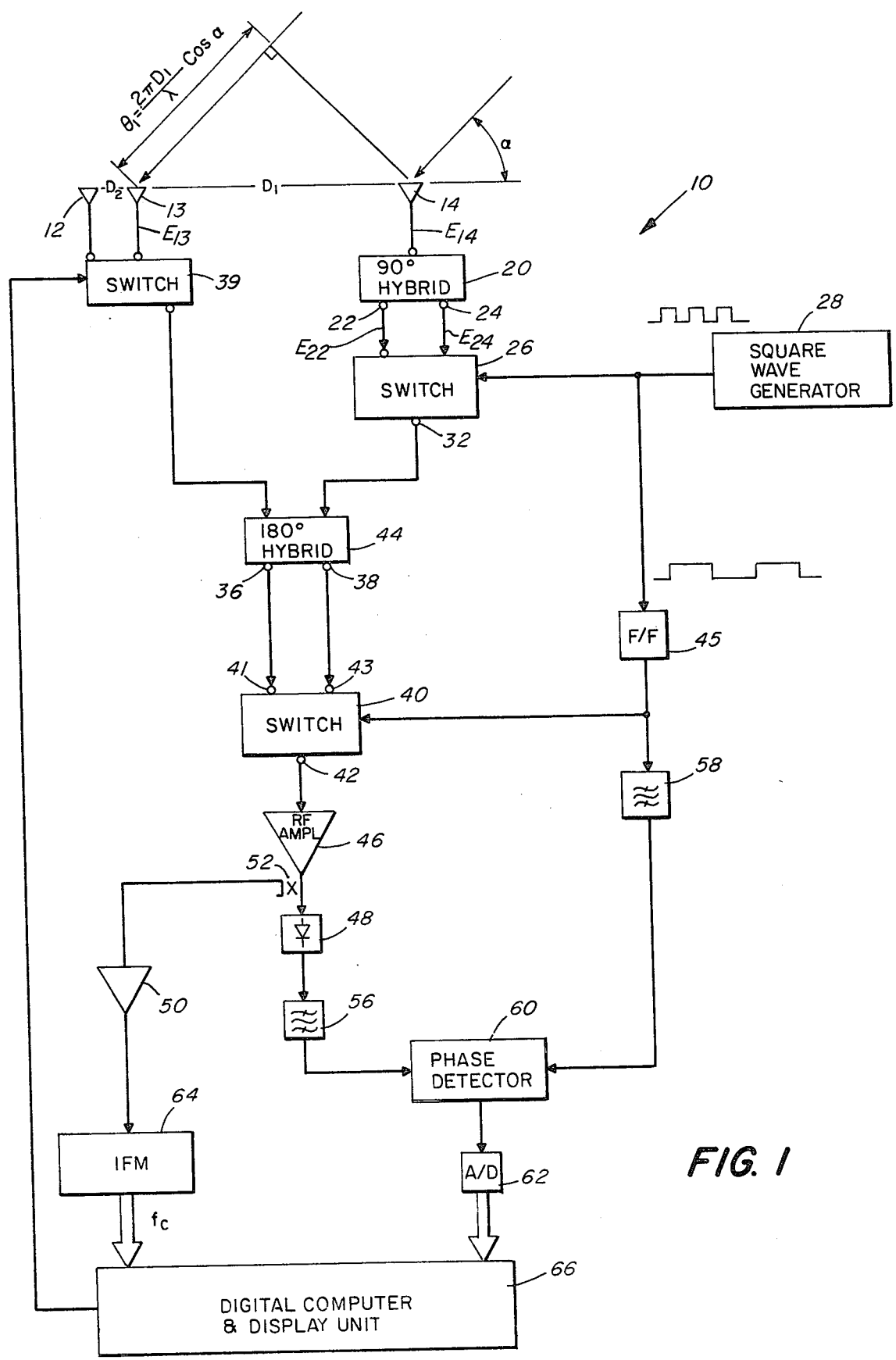
FIG. 1 is a block diagram of a radio frequency signal direction finding system according to the invention.

Referring now to FIG. 1, a radio frequency signal direction finding apparatus 10 is shown. Such apparatus 10 includes two pairs of antennas 13, 14 and 12, 14. The radio frequency antennas 13, 14 in one of the pairs are separated by a predetermined distance $D_1$ as shown. The antennas 12, 14 in the other one of the pairs are separated by a predetermined distance $D_1+D_2=D_3$, as shown. It follows then that radio frequency energy received by the first one of such pairs of antennas 13, 14 from a source at an angle of arrival $\alpha$ will have a phase difference $\theta_1$, equal to $(2\pi D_1 \cos\alpha)/\lambda$, where $\lambda$ is the wavelength of the received signals. The radio frequency signals received by the second pair of antennas 12, 14 from the source will have a phase difference $\theta_2$ equal to $(2\pi D_3 \cos\alpha)/\lambda$. Considering first the signals received by the antennas 13, 14 such signals may be represented respectively as θ:

$$E_{13} = A \cos(2\pi f_c t - \theta_1) \quad (1)$$

and $$E_{14} = A \cos(2\pi f_c t) \quad (2)$$

respectively, where $f_c$ is the frequency of the received signal (i.e. $f = c/\lambda$, where c is the speed of light).

Figure 2A:
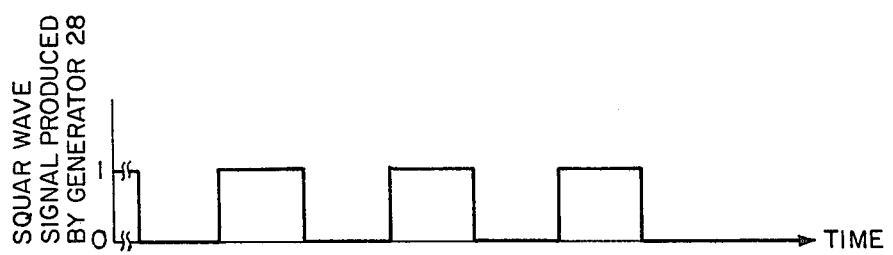
FIGS. 2A-2D are timing diagrams useful in understanding the operation of the direction finding system of FIG. 1.
Figure 2B:
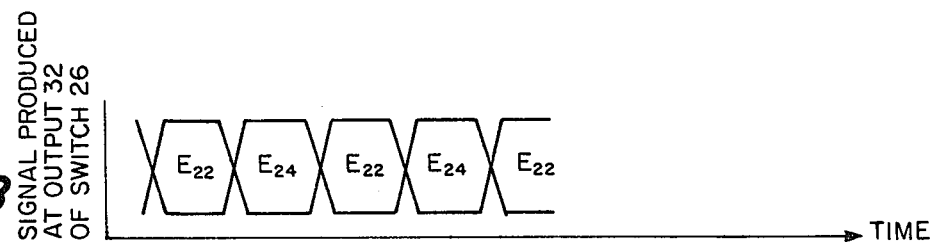

The signals produced at the output of antenna 14 is fed to a 90° hybrid junction 20. Such hybrid junction 20 is of any conventional signal having a pair of output terminals 22, 24, as shown. The signals produced at the output terminals 20, 24 may be represented as:

$$E_{22} = (A/\sqrt{2}) \cos 2\pi f_c t \quad (3)$$

and, $$E_{24} = (A/\sqrt{2}) \cos(2\pi f_c t - \pi/4) = (A/\sqrt{2}) \sin(2\pi f_c t) \quad (4)$$

respectively. The signals produced at the output terminals 22, 24 ($E_{22}$, $E_{24}$, respectively) are fed to a radio frequency switch 26, as shown. Also fed to such switch 26 is a switching signal produced by a conventional square wave generator 28, as shown. Here the square wave generator 28 produces a train of pulses at a 60 MHz rate, as shown in FIG. 2A. When the signal produced by generator 28 is "low" (i.e. logical 0), switch 26 electrically couples the signal at output terminal 22 of hybrid junction 20, (i.e. $E_{22}$) to the output terminal 32 of switch 26 and when the signal produced by generator 28 is "high" (i.e. logical 1) switch 26 electrically couples the signal at output terminal 24 of hybrid junction 20 (i.e. $E_{24}$) to output terminal 32 as shown in FIGS. 2A and 2B.

The signals produced at the outputs of antennas 12, 13 are fed to a switch 39, as shown. Switch 39 operates at a substantially lower rate that the 60 MHz operating rate of switch 26, typically set a rate of several KHz. In this way system 10 is able to operate with antenna spacings $D_1$ and $D_3$ greater than $\lambda/2$ as where high accuracy direction finding is desired. It is noted that, as will be described hereinafter, system 10 determines the phase angle $\theta_1$, between the signals received by antennas 13, 14 where the switch 39 is in a first state and determines the phase angle $\theta_2$ of the signals received by antennas 12, 14 when the switch 39 is in a second state, as will be described hereinafter. Thus, first considering the case when the switch 39 is in the first state, antenna 13 is coupled through switch 39 to a 180° hybrid junction 44, as shown. The signal produced at the output terminal 32 (i.e. either $E_{22}$ or $E_{24}$) of switch 26 is also fed to hybrid junction 44, as shown. Hybrid junction 44 has a pair of output terminals 36, 38 as shown. The output signal produced at output terminal 36 may be represented as the sum of the signals fed to hybrid junction 44 and the output signal produced at output terminal 38 may be represented as the difference of the signals fed to hybrid junction 44. That is, when the signal produced by square wave generator 28 is low so that $E_{22}$ is coupled to output terminal 32, the signals produced at the output terminal 36 may be represented as ($E_{13} + E_{22}$) as the signal produced at the output terminal 38 may be represented as ($E_{13} - E_{22}$). Alternatively, when the signal produced by the square wave generator 28 is high so that the $E_{24}$ is produced at output terminal 32, the signal produced at the output terminal 36 may be represented as $E_{13} + E_{24}$ and the signal produced at output terminal 38 may be represented as $E_{13} - E_{24}$.

Figure 2C:
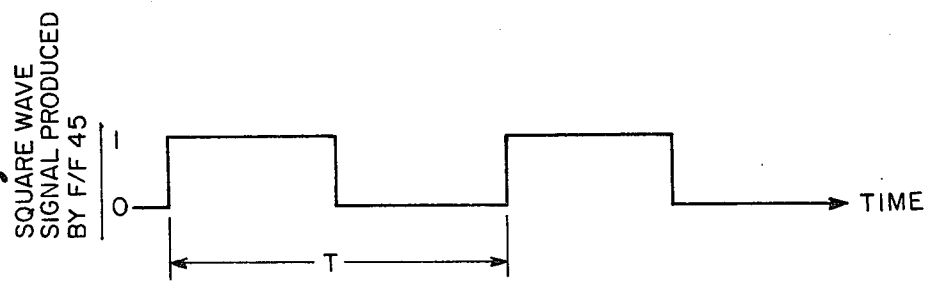
Figure 2D:
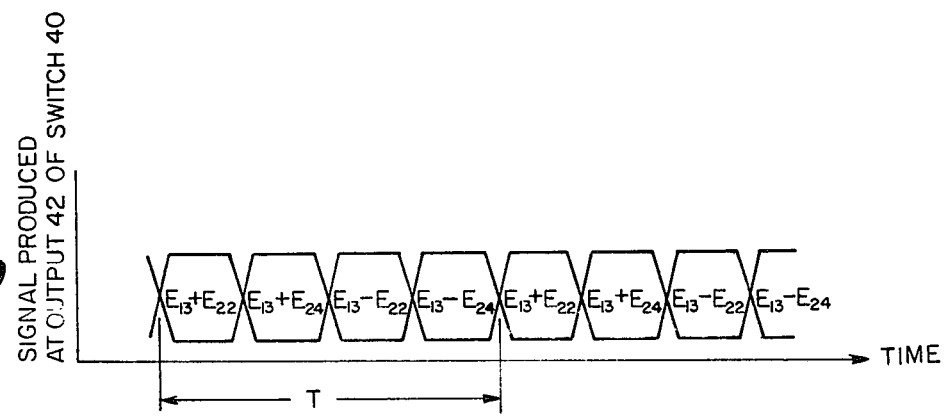

The signals produced at the output terminals 36, 38 are fed to a pair of input terminals 41, 43 of a second radio frequency switch 40, as shown. Also fed to switch 40 is a signal produced by a flip/flop 45 coupled to the output of square wave generator 28 to divide the frequency of the square wave generator 28 by 2 to thereby produce a square wave signal having a frequency of here 30 MHz, as shown in FIG. 2C. When the square wave signal fed to switch 40 is "high" (i.e. logical 1), the signal produced at output terminal 36 of hybrid junction 44 is electrically coupled to output terminal 42 of switch 40 and when the square wave signal fed to switch 40 is "low" (i.e. logical 0), the signal produced at output terminal 38 of hybrid junction 44 is electrically coupled to output terminal 42 of switch 40. It follows then that, as shown in FIGS. 2A-2D, when the square wave signal fed to switch 40 is "high" and the square wave signal fed to switch 26 is "low" the signal produced at output 42 of switch 40 may be represented as $E_{13} + E_{22}$. Then when the square wave signal fed to switch 26 goes high (the square wave signal fed to switch 40 remaining high) the signal produced at the output terminal 42 may be represented as $E_{13} + E_{24}$. Next, as the square wave signals fed to switch 26 and 40 both go low the signal produced at ouput terminal 42 may be represented as $E_{13} - E_{22}$. Completing the cycle, T, when the square wave signal fed to switch 26 goes high (while the square wave signal fed to switch 40 remains low) the signal produced at the output terminal 42 may be represented as $E_{13} - E_{24}$. In summary, a composite signal made up of the following sequence of signals $E_{13} + E_{22}$; $E_{13} + E_{24}$; $E_{13} - E_{22}$; $E_{13} - E_{24}$, as shown in FIG. 2D.

The composite signal produced at output terminal 42 is amplified in a radio frequency amplifier 46 as shown in FIG. 1. The signal is fed, inter alia, to a square law detector 48, as shown, and a small portion of such amplified signal is fed to a limiting amplifier 50, as shown, through a coupler 52, as shown. The output of the square law detector 48 is fed to a bandpass filter 56, here tuned to the fundamental frequency component of the square wave signal fed to switch 40, here tuned to a frequency of 30 MHz. Likewise, the square wave signal produced by flip/flop 45, which provides the square wave signal for switch 40 is fed to a bandpass filter 58, here also tuned to the fundamental frequency component of the square wave signal fed to switch 40, i.e. here tuned to a frequency of 30 MHz. The signals produced at the outputs of bandpass filters 56, 58 are fed to a conventional phase detector 60, as shown. The output of phase detector 60 is a voltage representative of the phase difference $\theta_1$, between the radio frequency signals received by the pair of antennas 13, 14.

In order to provide an indication of the direction of the source of the received signal (i.e. the angle α) the output of the phase detector 60 is fed to a conventional analog to digital converter 62 to produce a digital word representative of the phase angle $\theta_1$. A portion of the signal produced at the output of radio frequency amplifier 46 is fed to a conventional digital instantaneous frequency measuring (IFM) unit 64 through the coupler 52 and the limiting amplifier 50, as shown. The output of the digital IFM 64 thereby produces a digital word representative of the frequency $f_c$ of the received signals. The digital words produced by the digital IFM 64 and analog to digital (A/D) converter 62 are fed to a conventional digital computer and display unit 66, as shown.

In order to understand the operation of the radio frequency signal direction finding apparatus 10, and still considering the signals received by the pair of antennas 13, 14, it might be helpful to consider the following examples: (1) the condition when the signals received by the pair of antennas 13, 14 are in phase (i.e. $\theta_1 = 0°$); and, (2) the condition when the signals received by the pair of antennas 13, 14 are 90° out of phase (i.e. $\theta_1 = 90°$). When the signals received by the pair of antennas 13, 14 are in phase (i.e. $\theta_1 = 0°$), the signal produced at the output of antenna 13 may be represented by: $A \cos 2\pi f_c t$ and the signal produced at the output of antenna 14 may be represented by: $A \cos 2\pi f_c t$. The sequence of signals produced at output terminal 42 (i.e. the composite signal) may be represented as (referring also to FIG. 2D):

$$A[\cos (2\pi f_c t) + (\cos (2\pi f_c t)/\sqrt{2}\,)];$$

$$A[\cos (2\pi f_c t) + (\sin (2\pi f_c t)/\sqrt{2}\,)];$$

$$A[\cos (2\pi f_c t) - (\cos (2\pi f_c t)/\sqrt{2}\,)];$$

and $$A[\cos (2\pi f_c t) - (\sin (2\pi f_c t)/\sqrt{2}\,)]$$

The composite signal is amplified in R.F. amplifier 42, here by a gain $\sqrt{2}K$, and the major portion of the power of the amplified signal is passed to square law detector 48 which provides an output signal representative of the square of the composite phasor fed to it. That is, referring to FIG. 3A, during the first quarter cycle of the period T of the square wave signal fed to switch 40 (shown in FIG. 3B), the output of the square law detector 48 will be (neglecting higher order harmonies which are filtered), $A^2K^2 (1+\sqrt{2})^2$. Similarly, the output of detector 48, for the second, third and fourth quarters of the period T will be: $1.5A^2K^2$; $A^2K^2 (1-\sqrt{2})^2$; and $1.5A^2K^2$, respectively, as shown. Referring to FIGS. 3A and 3B it is noted that the signal produced at the output of detector 48 (FIG. 3A) has a fundamental frequency component shown by the dotted curve 75, such curve 75 being represented by: $\sin (2\pi t/T) + \pi/4$ where T is the period of the square wave signal fed to switch 40. Further, the square wave signal fed to switch 40, i.e. the output of flip/flop 45 (FIG. 3B) has a fundamental frequency component shown by the dotted curve 77, such curve being represented by $\sin [(2\pi t/T)]$. That is, the fundamental frequency components of the square wave signal fed to switch 40 and the composite signal have a frequency here 30 MHz and have a fixed phase difference $\pi/4$ when the signals received at the pair of antennas 13, 14 are in phase, i.e. $\theta_1 = 0°$.

Considering now the condition where the phase difference between the radio frequency signals received by the pair of antennas 13, 14 are 90° out of phase ($\theta_1 = 90°$), that is, where, the signal received by antenna 13 may be represented as $A \cos (2\pi f_c t - 90°) = A \sin 2\theta f_c t$ and the signal received by antenna 14 may be represented as $A \cos 2\pi f_c t$. The composite signal produced at output terminal 42 may be represented as a sequence of four signals:

$$A[\sin 2\pi f_c t + (\cos (2\pi f_c t)/\sqrt{2}\,)];$$

$$A[\sin 2\pi f_c t + (\sin (2\pi f_c t)/\sqrt{2}\,)];$$

$$A[\sin (2\pi f_c t) - (\cos (2\pi f_c t)/\sqrt{2}\,)];$$

and $$A[\sin (2\pi f_c t) - (\sin (2\pi f_c t)/\sqrt{2}\,)]$$

It follows then that, referring to FIG. 4A, the output of square law detector 48 is a periodic signal having an amplitude which, during the first, second, third and fourth quarters of each cycle of the switching square wave signal fed to switch 40 (FIG. 4A) is: $1.5A^2K^2$; $A^2K^2 (\sqrt{2}+1)^2$; $1.5A^2K^2$; and $A^2K^2 (\sqrt{2}-1)^2$ respectively. That is, the signal produced at the output of square law detector 48 has a fundamental frequency component represented by the dotted curve 75' in FIG. 4A and such curve 75' may be represented by: $\sin [(2\pi t/T - \pi/4)]$. Here again the square wave signal fed to switch 40, shown in FIG. 4B, has a fundamental frequency component represented by curve 77 in FIG. 4B and such curve 77 may again be represented by: $\sin 2\pi t/T$. These fundamental frequency components are passed through bandpass filters 56, 58 to phase detector 60. In response to the signals fed thereto the phase detector 60 produces a voltage representative of the phase difference between such signals, here as voltage representative of a phase difference of $-\pi/4$. That is, when the signals fed to the pair of antennas 13, 14 are 90° out of phase the phase difference between the fundamental frequency signal components of the signals fed to phase detector 60 is $-\pi/4$. A little thought will make it apparent, therefore, that as the difference in phase of the signals fed to antennas 13, 14 change from 0° to 90° the difference in the phase between the signals fed to phase detector 60 change correspondingly from 90° from $\pi/4$ to $-\pi/4$. More particularly, the difference in the phase $\Delta\theta$, of the signals fed to phase detector 60 may be represented as $\Delta\theta_1 = (\pi/4 - \theta_1)$, and $\theta_1 = \pi/4 - \Delta\theta^1$. Consequently, the difference in phase of the signals fed to phase detector 60 is related by the difference in phase between the signals received by the pair of antennas 13, 14. The computer 66 thereby calculates the direction of the source of the radio frequency signals, $\alpha$, in accordance with the following equation:

$$\alpha = \cos^{-1}[(\theta_1 + 2n\pi)c/(2\pi f_c D_1)] \quad (5)$$

where n is zero for $D_1 \leq \lambda/2$ or an integer where $D_1 > \lambda/2$. Since here the spacing $D_1$ is greater than $\lambda/2$ to provide high accuracy direction finding the integer n must be determined. Thus, after the computer 66 has had sufficient time to determine $\theta_1$, as described, a switching signal is fed by the computer 66 to switch 39 to couple antenna 12 to hybrid junction 44 and to decouple antenna 13 from such hybrid junction. The process repeats to enable the computer 66 to calculate the $\theta_2$. Thus since $\alpha$ from the equation is:

$$\alpha = \cos^{-1}[c(\theta_2 + 2n\pi)/2\pi f(D_1 + D_2)] \quad (6)$$

The computer 66 then solves equations (5) and (6) simultaneously to yield a unique solution for n and thus α.

Having described a preferred embodiment of this invention, it will now be apparent to one of skill in the art that many changes may be made without departing from the invention concepts. Thus, it is felt that this invention should not be restricted to its disclosed embodiment, but rather should be limited only by the spirit and scope of the appended claims.

What is claimed is:

1. A system for determining the difference in phase between a pair of radio frequency signals comprising:
    (a) means, responsive to a periodic square wave signal having a fundamental frequency component, for periodically changing the phase of a first one of the pair of radio frequency signals $n\pi/2$ radians, where n is an integer, each quarter cycle of the periodic square wave signal, such means including means for combining such periodically phase changing signal with a second one of the pair of radio frequency signals to produce a composite radio frequency signal;
    (b) means, responsive to the composite radio frequency signal, for producing a detected electrical signal having as a fundamental frequency component the fundamental frequency component of the periodic square wave signal, the relative phase between the fundamental frequency component of the periodic signal and the fundamental frequency component of the detected electrical signal being related to the difference in phase between the pair of radio frequency signals; and
    (c) means, responsive to the periodic square wave signal and the detected electrical signal, for determining the relative phase difference between the fundamental frequency components of the periodic square wave signal and the detected electrical signal.

2. The system recited in claim 1 including a radio frequency amplifier fed by the composite signal to amplify such composite electrical signal and couple such amplified signal to the determining means through the detected signal producing means.

3. The system recited in claim 2 including a detector means disposed between the output of the radio frequency amplifier and the determining means.

4. A system for determining in phase between a pair of radio frequency signals, comprising:
    (a) means, responsive to a square wave signal having a fundamental frequency component $f_1$ for alternatively coupling, at a rate $r_1$, a first one of such pair of radio frequency signals and a quadrature phase shifted component thereof to an output terminal;
    (b) means for producing a second pair of radio frequency signals, one of such second pair of signals being the sum of the second one of the first mentioned pair of radio frequency signals and the signal coupled to the output terminal and a second one of such second pair of radio frequency signals being the difference between the second one of the first mentioned pair of radio frequency signals and the signal coupled to the output terminal;
    (c) means, responsive to a second square wave signal having a fundamental frequency $f_1/2$, for alternatively coupling, at a rate $2r_1$, the first and second ones of the second pair of radio frequency signals to a second output terminal to form a composite signal at such second output terminal;
    (d) a radio frequency amplifier means, fed by the composite signal, to amplify such composite signal;
    (e) detector means fed by the amplified composite signal, for producing a detected signal having as a fundamental frequency component thereof the frequency $f_1/2$, such amplified composite signal differing in phase from the second square wave signal an amount related to the difference in phase between the first mentioned pair of radio frequency signals; and
    (f) means for detecting the difference in phase between the fundamental frequency components of the detected signal and the second square wave signal to produce an indication of the difference in phase between the first mentioned pair of radio frequency signals.

5. A system for determining the difference in phase between a pair of radio frequency signals having a frequency within a predetermined instantaneous bandwidth, comprising:
    (a) means, responsive to the pair of signals and a periodic signal having a fundamental frequency component, for changing the phase of a first one of the pair of radio frequency signals including means for combining such phase changing signal with a second one of the pair of radio frequency signals to produce a composite signal having the frequency of the pair of radio frequency signals within said predetermined instantaneous bandwidth;
    (b) means, fed by the composite signal for producing a third signal having as a fundamental frequency component the fundamental frequency component of the periodic signal, the relative phase between the fundamental frequency component of the periodic signal and the fundamental frequency component of the third signal being related to the difference in phase between the pair of radio frequency signals; and
    (c) means, responsive to the periodic signal and the third electrical signal, for determining the relative phase difference between the fundamental frequency components of the periodic signal and the third electrical signal.

* * * * *